United States Patent Office 2,803,665
Patented Aug. 20, 1957

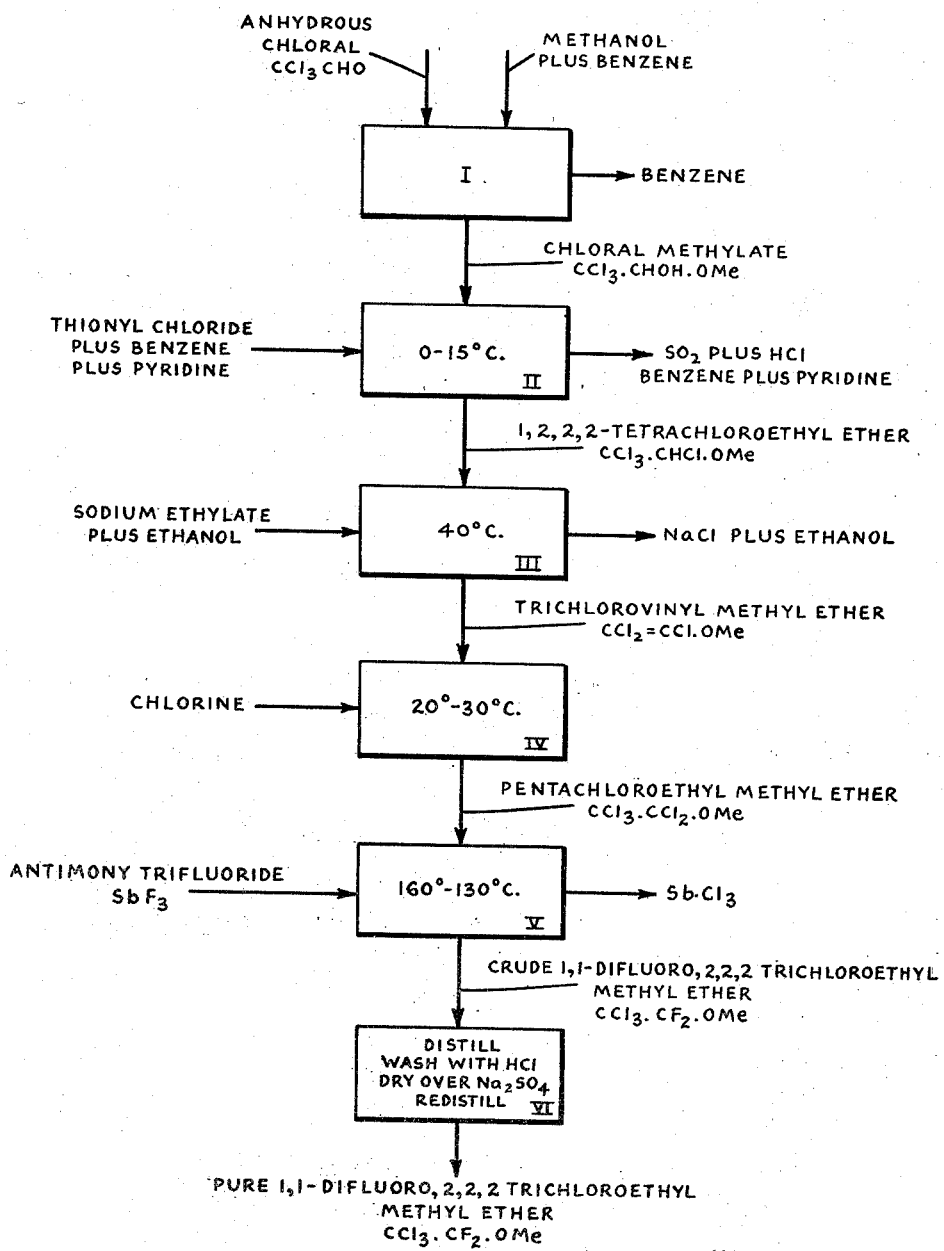

2,803,665

FLUORINE CONTAINING ETHERS AND PROCESS FOR PREPARATION THEREOF

Charles B. Miller, Lynbrook, and Cyril Woolf, Long Island City, N. Y., assignors to Allied Chemical & Dye Corporation, New York, N. Y., a corporation of New York Application May 5, 1953, Serial No. 353,194

3 Claims. (Cl. 260—614)

This invention relates to linear ethers containing the grouping

R—CF$_2$—O—R'H wherein R is a perhalogenated, perfluorinated, perchlorinated, or perbrominated hydrocarbon group and R' is either and unsubstituted hydrocarbon radical or a halogen substituted hydrocarbon radical, and to a method of preparation of these compounds.

Prior to my invention, it has not been feasible to manufacture linear ethers containing two fluorine groups in the alpha or "1" position by direct fluorination. The number and location of the fluorine atoms in the molecules of the reaction products have been unpredictable, and their precise control has not heretofore been ascertainable. When fluorinating a perhalogenated compound, such as one containing e. g. a perchloro n-alkyl group, it has been observed that the fluorine readily reacts with e. g. the —CCl$_3$ group or groups present to form —CCl$_2$F, —CClF$_2$, and —CF$_3$. It is however generally acknowledged that it is difficult or impossible to selectively replace both halogens on an alpha —CCl$_2$— group with fluorine, because of the sluggishness of the reaction, the extremely low yields, and the comparatively large production of difficultly separable isomers.

Furthermore fluorinating compounds, such as antimony trifluoride by itself, have not heretofore been found to act efficiently to permit the exchange of halogen atoms to proceed to completion in a controlled manner.

Neither this compound, nor others generally thought to be equivalent thereto, have been successful in controlling the introduction of fluorine groups solely into a selected —CCl$_2$— group.

One object of this invention is to set forth a fluorination procedure wherein (a) antimony trifluoride, (b) anhydrous hydrogen fluoride, or (c) anhydrous hydrogen fluoride plus small amounts of antimony trihalide, may be employed to prepare fluorinated compounds of predetermined composition and of desired purity.

A second object of this invention is to set forth a method of preparing linear ethers containing a non-perhalogenated radical and a 1,1-difluoro perhalohydrocarbon radical from ethers containing a single perhalogenated hydrocarbon radical, the alpha-carbon atom of which bears chlorine or bromine atoms.

A third object of this invention is to set forth as new products, linear ethers containing a nonperhalogenated radical and a second radical which is either a 1,1-difluoro perhalohydrocarbon radical, a 1,1-difluoro perfluorohydrocarbon radical, a 1,1-difluoro perchlorohydrocarbon radical, or a 1,1-difluoro perbromohydrocarbon radical.

Other objects of this invention will be apparent to those skilled in the art on an inspection of the accompanying drawing and the following description.

This invention in certain of its aspects, comprises as new products, stable ethers containing respectively on opposed sides of the ether grouping, —C—O—C—, (a) a perhalogenated hydrocarbon radical in which the indicated alpha carbon atom is linked to two fluorine atoms, and (b) a hydrocarbon radical which may be unsubstituted or partially halogenated. Typical novel products of this invention may be represented by the following formula:

RC$_n$Y$_{2n}$CF$_2$.O.R'H wherein Y is one or more halogens selected from the group consisting of fluorine, chlorine, or bromine; R is selected from the group consisting of Y and perhalogenated hydrocarbon radicals; R' is selected from the group consisting of unsubstituted hydrocarbon radicals and halogens (preferably chlorine or bromine) substituted hydrocarbon radicals; and n is an integer, preferably in the range of 1 to 3.

Among the preferred new products which may be made by this invention, are those in which R' is one of the following groups: alkylene radicals including —CH$_2$—, —CHCl—, —CHBr—, —CCl$_2$—, —CBr$_2$—, —C$_2$H$_4$—, —C$_3$Cl$_6$—, and —C$_3$Br$_6$—; aromatic type groups including —C$_6$H$_4$—, —C$_6$Cl$_4$—, and —CH$_3$C$_6$H$_3$; cycloapiphatic type groups including —C$_6$H$_{10}$—. R may be one of the following groups among others: Cl, Br, CCl$_3$—, CBr$_3$—, CCl$_2$Br—, CClBr$_2$—, C$_2$Cl$_5$—, and C$_2$Br$_5$. n of the formula may be 1,2,3, or any other integer.

A specific group of useful new products is that included within the general formula CY$_3$(CY$_2$)$_m$CF$_2$.O.R'H wherein m may be an integer, preferably 1–3.

Other specific groups of useful new products are those included within the general formulae RC$_m$Y$_{2m}$CX$_2$CF$_2$.O.R'H
and RCX$_2$CF$_2$.O.R'H wherein X is one or more of the halogens selected from the group consisting of chlorine and bromine. In the above formula, m may be zero or any integer.

Typical compounds which may be produced include:

CCl$_3$CF$_2$.O.CH$_3$
CBr$_3$CF$_2$.O.C$_2$H$_5$
CCl$_3$CCl$_2$CF$_2$.O.i—C$_3$H$_7$
CBr$_3$CBr$_2$CBr$_2$CF$_2$.O.n—C$_4$H$_9$
CCl$_3$CBr$_2$CF$_2$.O.CH$_3$
CCl$_3$CF$_2$.O.C$_6$H$_5$
CCl$_2$BrCF$_2$.O.CH$_3$

These new products are valuable as intermediates in the production of organic chemicals, dyes, synthetics, and pharmaceuticals, containing controlled amounts of fluorine in positively ascertainable positions. Preparation thereof according to preferred procedures results in the formation of substantially no isomers or undesirable by-products. In addition their physical and chemical properties permit their use as solvents, diluents, reaction media, heat exchange media, etc.

According to another aspect of this invention, a preferred method of producing these novel products, employs as a starting ether, a material corresponding to the desired product, except that the alpha carbon of the perhalogenated radical contains substituents selected from the group consisting of chlorine and bromine. This starting ether is subjected to the action of a fluorinating agent, selected from the group consisting of antimony trifluoride, hydrogen fluoride, and antimony trihalide plus hydrogen fluoride.

When (a) the starting material is one of the compounds having the formula

RC$_m$Y$_{2m}$CY'$_2$CX$_2$.O.R'H
or
RCY'$_2$CX$_2$.O.R'H

Y and Y' each being one or more of the halogens selected from the group consisting of fluorine, chlorine, and bromine, at least one atom of Y' being fluorine, or (b) the group R' in the starting material contains a carbon chain of more than one carbon atom, at least one of which bears a halogen atom, greater ease of reaction and higher yields of product are obtained when the fluorinating agent is anhydrous hydrogen fluoride optionally containing antimony trihalide (e. g. antimony trichloride). In the above formula $m$ may be an integer, preferably 1–3.

The reaction proceeds very smoothly at temperatures between about 20° C. and the boiling point of the ethers present, preferably below about 200° C., the alpha substituted halogens being readily replaced by fluorine under these conditions. The reaction may be effected preferably under refluxing conditions in a liquid menstruum of the starting ether or mixtures thereof with the product ether, to which the fluorinating agent has been added or may be added during the course of the reaction. Antimony trifluoride if used, may be employed in solid form; hydrogen fluoride, if used, may be introduced into the reaction zone in anhydrous liquid form, and if added during the course of the reaction while refluxing, it may be introduced to the reaction mixture as anhydrous gas. Reaction may be effected at superatmospheric pressures in some cases. Reaction usually proceeds to completion within a few hours, and the fluorinated reaction product may be purified by conventional procedures. Use of the indicated fluorinating agents results in formation of substantially no products of monofluoro substitution or other side reaction. The yield of the desired product is ordinarily above 85% based on the starting ether.

The typical starting ethers which may be employed in practice of this invention include those having the general formula $$RC_nY_{2n}CX_2.O.R'H$$

wherein Y is one or more halogens selected from the group consisting of fluorine, chlorine and bromine; X is one or more halogens selected from the group consisting of chlorine and bromine; R is selected from the group consisting of Y and perhalogenated hydrocarbon radicals; R' is selected from the group consisting of unsubstituted hydrocarbon radicals and halogen substituted hydrocarbon radicals; and $n$ is an integer, preferably in the range of 1–3.

Other specific groups of useful starting ethers which may be employed in practice of this invention, include those having the general formulae $$RC_mY_{2m}CX_2CX_2.O.R'H,\ RCX_2CX_2.O.R'H$$

and $$CY_3(CY_2)_mCX_2.O.R'H$$

wherein $m$ may be an integer, preferably 1–3.

Among the preferred starting materials which may be alpha-difluorinated by the process of this invention are those in which R' is one of the following groups: alkyl type groups including —CH$_2$—, —CHCl—, —CHBr—, —CCl$_2$—, —CBr$_2$—, —C$_2$H$_4$—, —C$_3$Cl$_6$—, and —C$_3$Br$_6$—; aromatic type groups including —C$_6$H$_4$—, —C$_6$Cl$_4$—, and —CH$_3$C$_6$H$_3$—; cycloaliphatic type groups including —C$_6$H$_{10}$—, R may be one of the following groups among others: Cl, Br, CCl$_3$—, CBr$_3$—, CCl$_2$Br—, CClBr$_2$—, C$_2$Cl$_5$—, and C$_2$Br$_5$—. $n$ of the formula may be 1, 2, 3 or any other integer. Typical compounds useful as starting materials include:

CCl$_3$CCl$_2$.O.CH$_3$

CCl$_3$CCl$_2$.O.CH$_2$Cl

CBr$_3$CBr$_2$.O.C$_2$H$_5$

CCl$_3$CBr$_2$.O.CH$_2$CCl$_3$

CCl$_3$CCl$_2$.O.nC$_3$H$_7$

CBr$_2$Cl$_3$CCl$_2$.O.n—C$_4$H$_9$

CCl$_3$CCl$_2$CCl$_2$.O.C$_6$H$_{11}$

CF$_3$CCl$_2$CCl$_2$.O.C$_6$H$_5$

EXAMPLE

According to a particular embodiment of this invention, a 1,1-dihalogenated ether such as 1,1-dichloro, 2,2,2-trichloroethyl methyl ether, is refluxed with SbF$_3$ for an appropriate time until the halogen exchange has occurred. The product ether is distilled from the reaction menstruum, and washed, dried, and redistilled to prepare 1,1-difluoro, 2,2,2-trifluoro methyl ether.

The accompanying drawing sets forth a schematic flow diagram of one embodiment of this invention, showing a method of preparation of 1,1-difluoro, 2,2,2-trichloroethyl methyl ether from anhydrous chloral as a starting material.

*Step I*

In the reaction step I, designated by the uppermost box in the drawing, 300 parts by weight (2.20 mols) of anhydrous chloral may be added to 66 parts by weight (2.02 mols) of absolute methanol in an ice bath. The solid alcoholate which forms may be dissolved in 110 parts by weight of benzene.

$$CCl_3CHO + MeOH \rightarrow CCl_3.CHOH.OMe \qquad (I)$$

*Step II*

The chloral methylate may be chlorinated by dropping it into a solution of 161 parts by weight (2.02 mols) of pyridine, and 240 parts by weight (2.02 mols) of thionyl chloride in 500 parts by weight of benzene in a three-necked flask equipped with a stirring motor. The flask may be cooled in a dry ice-acetone bath which maintains the temperature at 0° C.–15° C. Enough water may be added to dissolve the pyridine hydrochloride which forms; 552 parts by weight of benzene are then distilled off. The remaining liquid, 1,2,2,2-tetrachloroethyl methyl ether, may be vacuum distilled through a Vigreux column to yield 293 parts by weight (1.49 mols) of a colorless, sweet-smelling liquid with a boiling point of 76° C.–78° C. at 23 mm. pressure. The yield is 74%.

$$CCl_3.CHOH.OMe + SOCl_2 \rightarrow \qquad (II)$$
$$CCl_3.CHCl.OMe + SO_2 + HCl$$

*Step III*

62 parts by weight (1.49 mols) of pellet sodium hydroxide may be dissolved in 70 parts by weight of water. To this solution may be added 500 parts by volume of ethyl alcohol, to form a solution of sodium ethylate in ethanol. (Alternatively a solution of sodium methylate in methanol analogously prepared, may be employed.) This solution may be added slowly and with stirring to 293 parts by weight (1.49 mols) of 1,2,2,2-tetrachloroethyl methyl ether. As the solution is added, a deep red color forms and the temperature rises very slightly. After the last of the solution is added, stirring may be continued for 20 minutes and a precipitate of sodium chloride may be observed. 300 parts by volume of water may be added to dissolve the sodium chloride. The water layer may be separated and 435 parts by weight of alcohol are fractionated. The water and oil layers may be combined and fractionated through a Vigreux column to yield 121 parts by weight (51% yield) of trichlorovinyl methyl ether having a boiling point of 135° C.–140° C.

$$CCl_3.CHCl.OMe + NaOEt \rightarrow \qquad (III)$$
$$CCl_2:CCl.OMe + NaCl + EtOH$$

*Step IV*

Chlorination of trichlorovinyl methyl ether may be accomplished by placing 112 parts by weight (0.7 mol) of the compound in a three neck flask fitted with a stirrer. Chlorine gas may be bubbled through the solution to yield pentachloroethyl methyl ether. The chlorinated compound may be distilled through a Vigreux column to yield 141 parts by weight (0.61 mol) of a liquid boiling at 189° C.–200° C. The yield is 87%.

$$CCl_2:CCl.OMe + Cl_2 \rightarrow CCl_3.CCl_2.OMe \qquad (IV)$$

Step V

In a one-liter, three neck flask equipped with stirrer and reflux condenser with a drying tube, are placed 338 parts by weight (1.45 mols) of pentachloroethyl methyl ether and 260 parts by weight (1.45 mols) of antimony trifluoride. The mixture may be stirred and heated for two hours. It begins to reflux at about 160° C. and at the end of two hours, the reflux temperature is 130° C. The fluorinated compound may be distilled off from the antimony salts, the liquid condensate boiling between 110° C. and 195° C. being collected. Washing with 1:1 hydrochloric acid removes antimony salts which may distill over. The washed liquor may be dried over sodium sulfate and distilled through a column packed with helices. The second fraction to distill over was 249 parts by weight (1.25 mols) of 1,1-difluoro, 2,2,2-trichloroethyl methyl ether which has a boiling point of 118° C. to 120° C. and a freezing point of −56° C. to −58° C. The yield was 85%.

$$3CCl_3.CCl_2.OMe + 2SbF_3 \rightarrow 3CCl_3CF_2.OMe + 2SbCl_3 \quad (V)$$

The structure of this compound is proved by hydrolyzing with 95% sulfuric acid. Hydrogen fluoride is the only material evolved, and from the hydrolyzed reaction product are isolated methyl trichloroacetate and trichloroacetic acid:

$$CCl_3.CF_2.OMe + H_2O \xrightarrow{H_2SO_4} CCl_3.COOMe + 2HF \quad (VI)$$

Other examples of reactions which may be conducted in similar manner to give comparable yields of products are:

$$CCl_2CCl_2.O.CH_2Cl + 2HF \longrightarrow CCl_2CH_2.O.CH_2Cl + 2HCl \quad (VII)$$

$$CBr_2CBr_2.O.C_5H_{11} + 2HF \xrightarrow{SbCl_5} CBr_2CF_2.O.C_5H_{11} + 2HCl \quad (VIII)$$

$$3CCl_2BrCCl_2.O.C_6H_5 + 2SbF_3 \longrightarrow$$
$$3CCl_2BrCF_2.O.C_6H_5 + 2SbCl_3 \quad (IX)$$

$$CCl_2CCl_2.O.CHClCH_3 + 2HF \longrightarrow$$
$$CCl_2CF_2.O.CHClCH_3 + 2HCl \quad (X)$$

The above examples are only illustrative of the various fluorinated ethers which may be prepared by the methods hereinbefore set forth, as is apparent to those skilled in the art.

In the specification and claims, the term halogen is employed to include fluorine, chlorine, and bromine. A perhalohydrocarbon radical is one wherein all the hydrogen atoms of a hydrocarbon radical have been replaced by halogens. Hydrocarbon radicals having at least one substituent other than halogen, include e. g. $CH_3CHF-$, as well as the alkyl groups such as $C_2H_5-$, i. e. hydrogen may be the other substituent.

We claim:

1. The method of preparing a linear ether having the formula $$C_nY_{2n+1}CF_2.O.R''H$$

wherein Y is selected from the group consisting of chlorine and bromine; R'' is selected from the group consisting of unsubstituted and chlorine-substituted alkylene radicals containing not more than four carbon atoms; and $n$ is an integer from 1 to 3; which method comprises reacting an ether, having the formula $$C_nY_{2n+1}CY'_2.O.R''H$$

wherein Y' is selected from the group consisting of chlorine and bromine, with a fluorinating agent selected from the group consisting of (a) antimony trifluoride, (b) anhydrous hydrogen fluoride, and (c) anhydrous hydrogen fluoride plus antimony trihalide, at temperature substantially in the range of 20° C. to the boiling point of said product ether, and continuing said reaction for a time sufficient and in the presence of fluorinating agent in amount sufficient to effect exchange of Y' and F to form said product ether.

2. The method of preparing 1,1-difluoro 2,2,2-trichloroethyl methyl ether which comprises reacting pentachloroethyl methyl ether starting material with a fluorinating agent selected from the group consisting of (a) antimony trifluoride, (b) hydrogen fluoride, and (c) hydrogen fluoride plus antimony trihalide, at temperature substantially in the range of 20° C. to the boiling point of said product ether, and continuing said reaction for a time sufficient and in the presence of fluorinating agent in amount sufficient to effect exchange of all of the alpha positioned chlorine, of a substantial amount of said starting material, with fluorine to form said product ether.

3. The method of claim 2 wherein the fluorinating agent is antimony trifluoride and the temperature of reaction is 130° C.–160° C.

References Cited in the file of this patent

UNITED STATES PATENTS

| | | |
|---|---|---|
| 2,409,274 | Hanford et al. | Oct. 15, 1946 |
| 2,500,218 | Towne et al. | Mar. 14, 1950 |
| 2,516,403 | McBee et al. | July 25, 1950 |
| 2,671,799 | Miller | Mar. 9, 1954 |

FOREIGN PATENTS

| | | |
|---|---|---|
| 523,449 | Great Britain | July 15, 1940 |